(12) United States Patent
Lin

(10) Patent No.: US 8,200,284 B2
(45) Date of Patent: Jun. 12, 2012

(54) COMMUNICATION DEVICE AND METHOD FOR MANAGING MULTIMEDIA FILES

(75) Inventor: Jen-Chiao Lin, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 399 days.

(21) Appl. No.: 12/541,516

(22) Filed: Aug. 14, 2009

(65) Prior Publication Data

US 2010/0112987 A1 May 6, 2010

(30) Foreign Application Priority Data

Oct. 30, 2008 (CN) .......................... 2008 1 0305307

(51) Int. Cl.
*H04W 8/02* (2009.01)
*H04B 1/38* (2006.01)

(52) U.S. Cl. .......................... 455/560; 370/338; 701/300

(58) Field of Classification Search ................ 455/414.1, 455/560; 705/702; 370/338; 701/300
See application file for complete search history.

(56) References Cited

U.S. PATENT DOCUMENTS

| 6,259,991 | B1 * | 7/2001 | Nysen | 701/300 |
| 2008/0311957 | A1 * | 12/2008 | Jantunen et al. | 455/560 |
| 2010/0023858 | A1 * | 1/2010 | Ryu et al. | 715/702 |
| 2010/0112987 | A1 * | 5/2010 | Lin | 455/414.1 |

* cited by examiner

*Primary Examiner* — William D Cumming
(74) *Attorney, Agent, or Firm* — Altis Law Group, Inc.

(57) ABSTRACT

A communication device and method for managing multimedia files include creating a multimedia file, and establishing communication between the communication device and a server through a base station, the server providing a region name of a region corresponding to each base station. The communication device and method further include searching the server for a region name of a region corresponding to the base station, creating a folder and naming the folder with the searched region name, and storing the created multimedia file into the folder.

18 Claims, 4 Drawing Sheets

COMMUNICATION DEVICE AND METHOD FOR MANAGING MULTIMEDIA FILES

BACKGROUND

1. Technical Field

Embodiments of the present disclosure relate to managing information, and more particularly to a communication device and method for managing multimedia files in the communication device.

2. Description of Related Art

Communication devices (e.g., mobile phones) provide various functionalities for people, such as the ability to capture photos and videos using camera modules installed in the communication devices, for example. If more and more multimedia files (e.g., photos) are stored into the communication device, it is difficult for people to find a target multimedia file from a mass of the multimedia files. In addition, it also may be difficult for people to remember where a multimedia files was captured.

What is needed, therefore, is an improved communication device and method for managing multimedia files.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
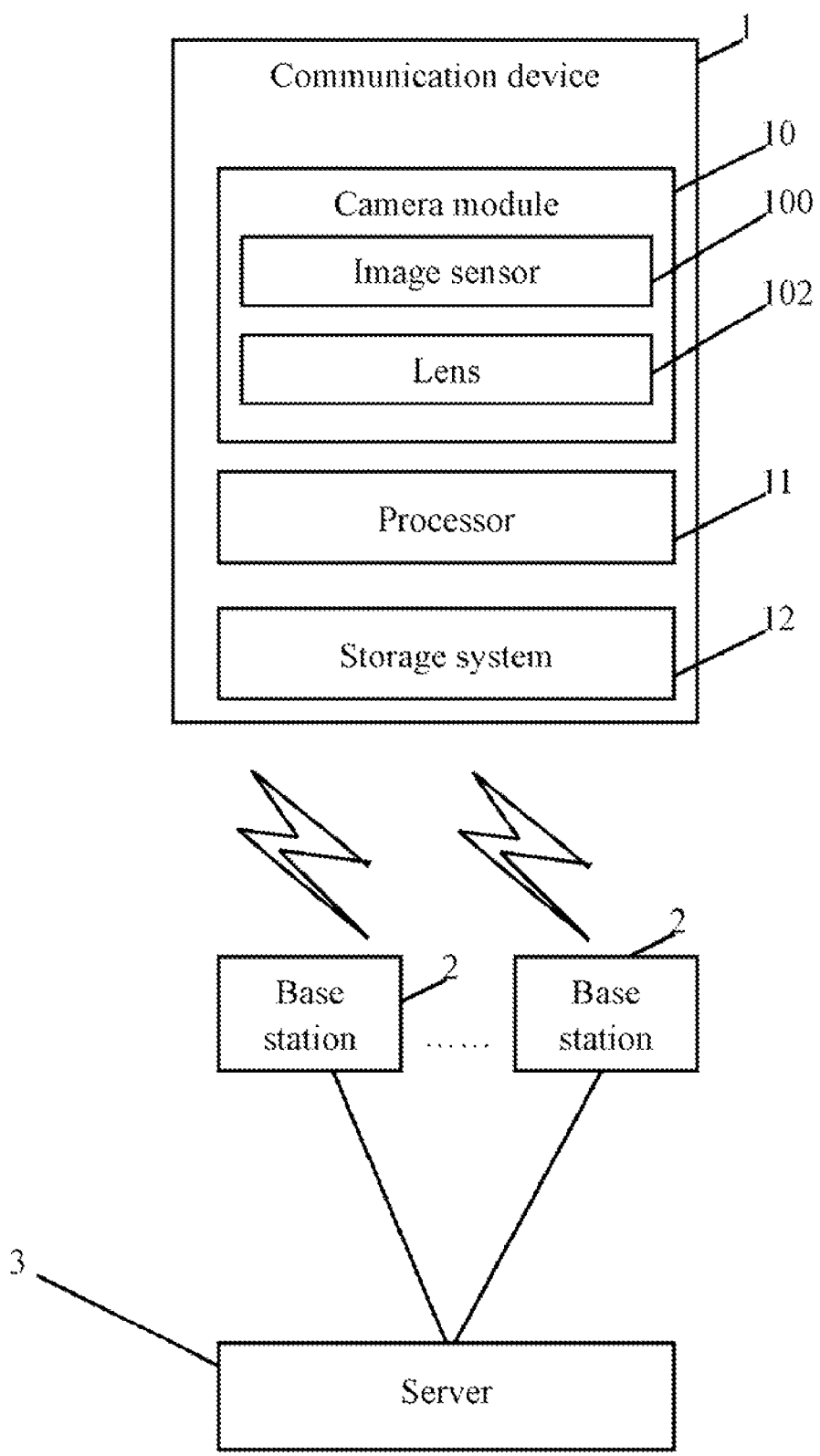
FIG. 1 is a block diagram of one embodiment of a communication device in communication with a server through a plurality of base stations.

FIG. 1 is a block diagram of one embodiment of a communication device 1 in communication with a server 3 through a plurality of base stations 2. The communication device 1 includes a camera module 10. The camera module 10 may be used to create multimedia files, such as to capture a photo or shoot a video, for example. The communication device 1 may be used to manage the created multimedia files. In one embodiment, the multimedia files (e.g., photos or videos) may be managed by assigning a filename to each of the multimedia files according to a location and/or a timestamp, creating file folders corresponding to the locations of the multimedia files, and sorting the multimedia files into corresponding file folders.

The communication device 1 may be a mobile phone, a personal digital assistant, a handheld computer, or any other kind of computing device. The camera module 10 may include an image sensor 100 and a lens 102. The image sensor 100 may be a charged coupled device (CCD) or a complementary metal-oxide-semiconductor transistor (CMOS) for capturing images.

The communication device 1 also includes a processor 11 and a storage system 12. The processor 11 executes one or more computerized operations of the communication device 1 and other applications, to provide functions of the communication device 1. The storage system 12 stores one or more programs, such as programs of an operating system, other applications of the communication device 1, and various kinds of data, such as the multimedia files (e.g., photos and videos), messages, or E-mails, for example. In one embodiment, the communication device 1 may be a mobile phone, and the storage system 12 may be a memory of the communication device 1 or an external storage card, such as a memory stick, a subscriber identification module (SIM) card, a smart media card, a compact flash card, or any other type of memory card.

The server 3 may be a host computer, for example. In one embodiment, the server 3 may be a web server, which provides a website including various webpages for people to browse or search information. In one embodiment, the plurality of base stations 2 may be wireless base stations or mobile telephone base stations, for example. Each base station 2 emits radio signals periodically, and each communication device 3 may identify a nearest base station 2 after receiving the radio signals.

Figure 4:
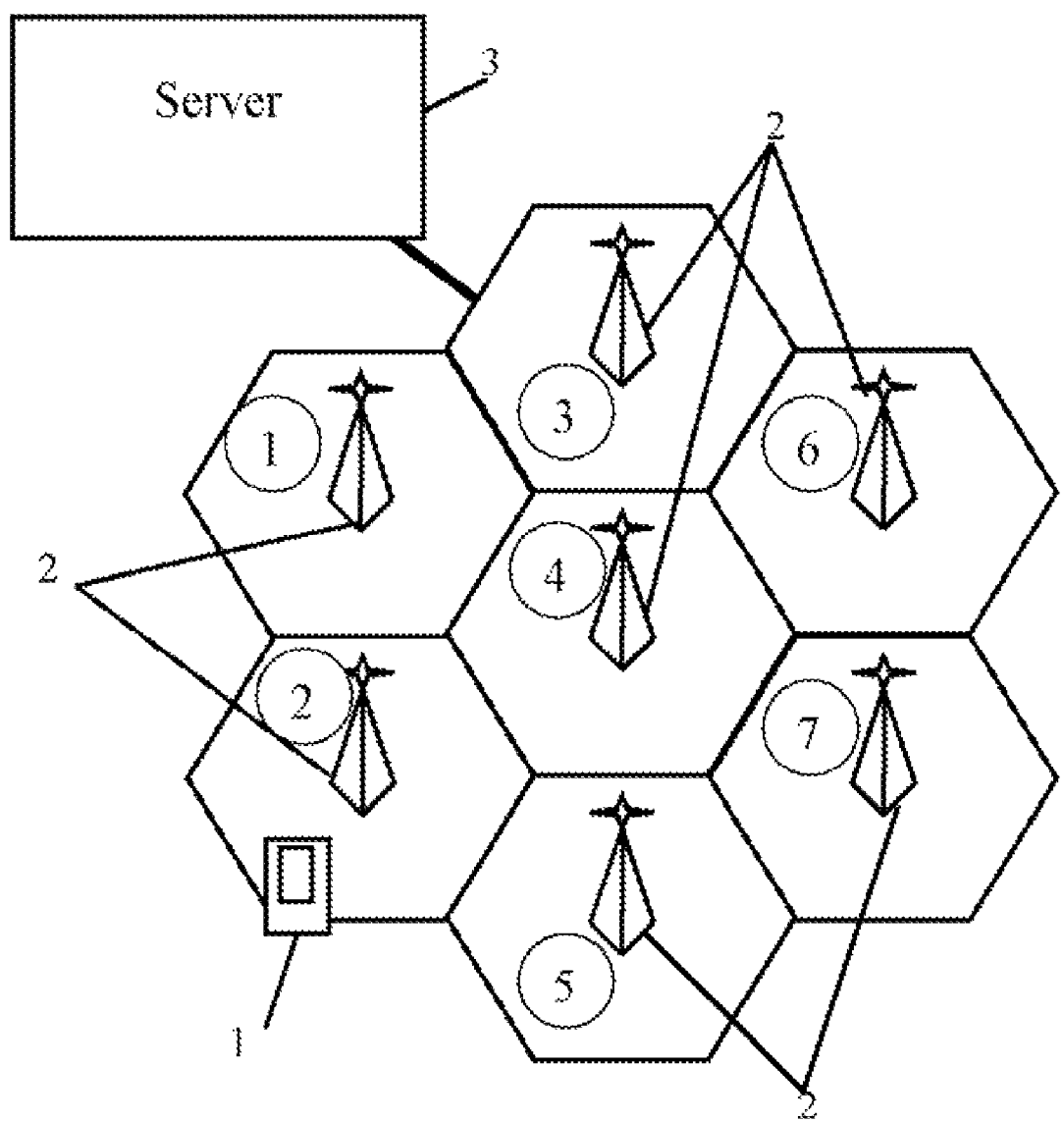
FIG. 4 is a schematic diagram of one embodiment of a distribution of the plurality of base stations.

In one embodiment, each of the plurality of base station 2 serves a geographical region/area. The region is partitioned according to distribution ranges of the plurality of base stations 2 and a coverage region of radio signals of each of the plurality of base station 2. For example, if a city has 100 base stations, then the city may be divided into 100 regions. Each of the plurality of base stations 2 is assigned to an identification (ID) number. Referring to FIG. 4, the distribution ranges of the plurality of base stations 2 and the region of each of the plurality of base stations 2 are shown. As shown, the communication device 1 is connected to the server 3 through a base station 2 having an ID number "2." In one embodiment, the ID number of each of the plurality of base stations 2 may be numerical, alphabetical, or alphanumerical, for example.

In one embodiment, the server 3 provides the ID number of each of the plurality of base stations 2 and a region name of a region corresponding to each of the plurality of base stations 2.

Figure 2:
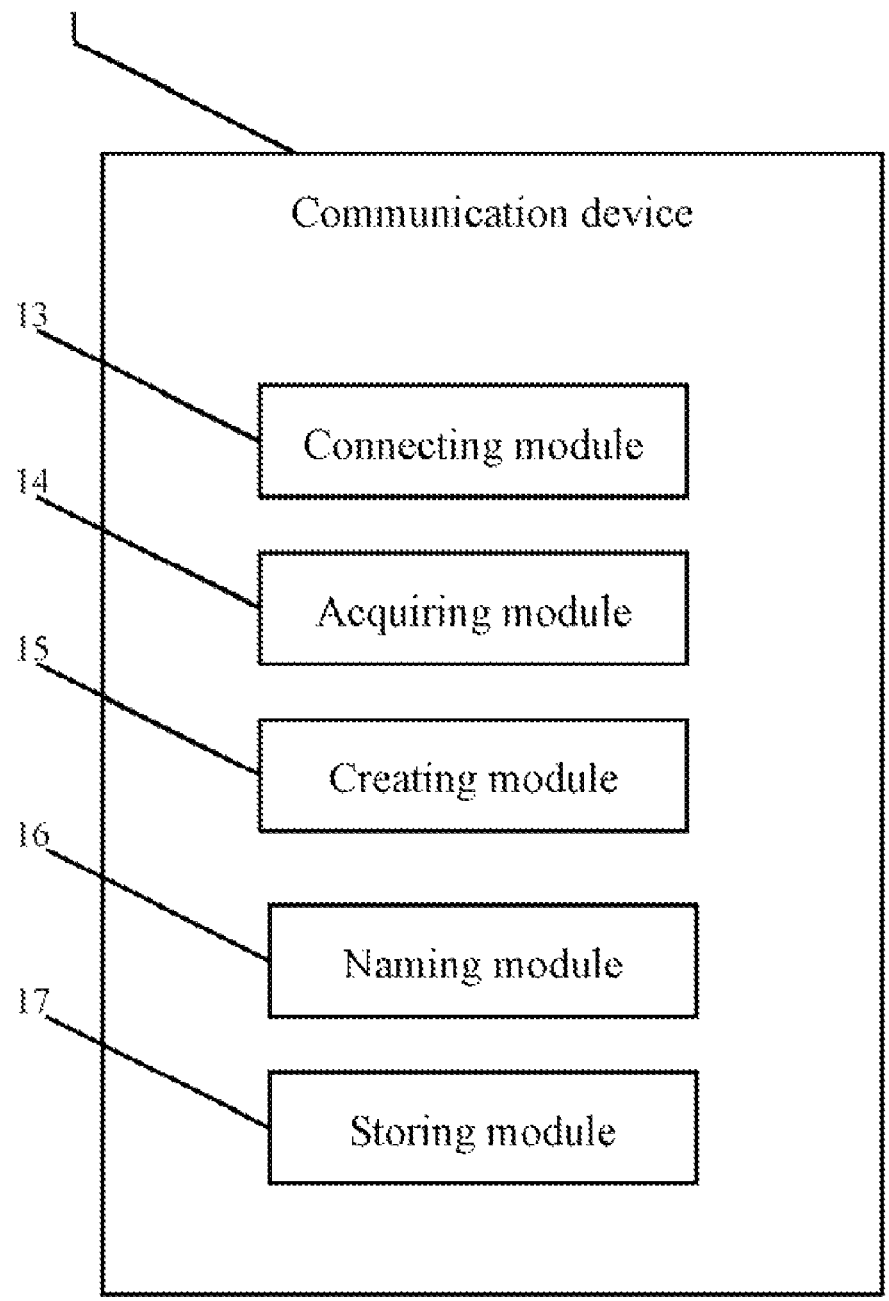
FIG. 2 is a block diagram of one embodiment of the communication device.

FIG. 2 is a block diagram of one embodiment of the communication device 1. In one embodiment, the communication device 1 includes a connecting module 13, an acquiring module 14, a creating module 15, a naming module 16, and a storing module 17. The modules 13, 14, 15, 16, and 17 may comprise computerized code in the form of one or more instructions, which are stored in a non-transitory storage medium, to be executed by the processor 11 to perform one or more operations of the communication device 1.

In one embodiment, a user may use the camera module 10 to create a multimedia file by capturing a photo or a video, for example. The connecting module 13 establishes communication between the communication device 1 and the server 3 through a base station 2.

The acquiring module 14 identifies an ID number of the base station 2 that communicates with the communication device 1 and the server 3. The acquiring module 14 further searches the server 3 for a region name of a region corresponding to the base station 2 according to the acquired ID number.

The creating module 15 creates a folder in the storage system 12, and the naming module 16 names the folder with the searched region name. If there are one or more folders in the storage system 12, the creating module 15 may search the storage system 12 and determine if the storage system 12 already has a folder named with the searched region name. If the storage system 12 already has the folder named with the searched region name, the creating module 15 does not need to create the folder again.

The naming module 16 names the created multimedia file according to the searched region name and/or a creation timestamp of the created multimedia file. The creation timestamp of the created multimedia file is acquired by the naming module 16. In one embodiment, if the timestamp is "2008-12-25" and the searched region name is "Washington," then the name of the created multimedia file (e.g., the captured photo or the captured video) may be "Washington20081225." The naming module 16 may further name the created multimedia file according to the searched region name, the creation timestamp, and/or a creation order of the created multimedia files in the folder. For example, if the created multimedia file is the eighth multimedia file in the folder named "Washington," the name of the created multimedia file may be "Washington20081225-008."

The storing module 17 stores the created multimedia file into the folder.

By utilizing the mentioned above modules 13-17, the photos, videos, and/or other data created by the camera module 10 may be organized and arranged into specified folders, so as to more easily identify and search multimedia files.

Figure 3:
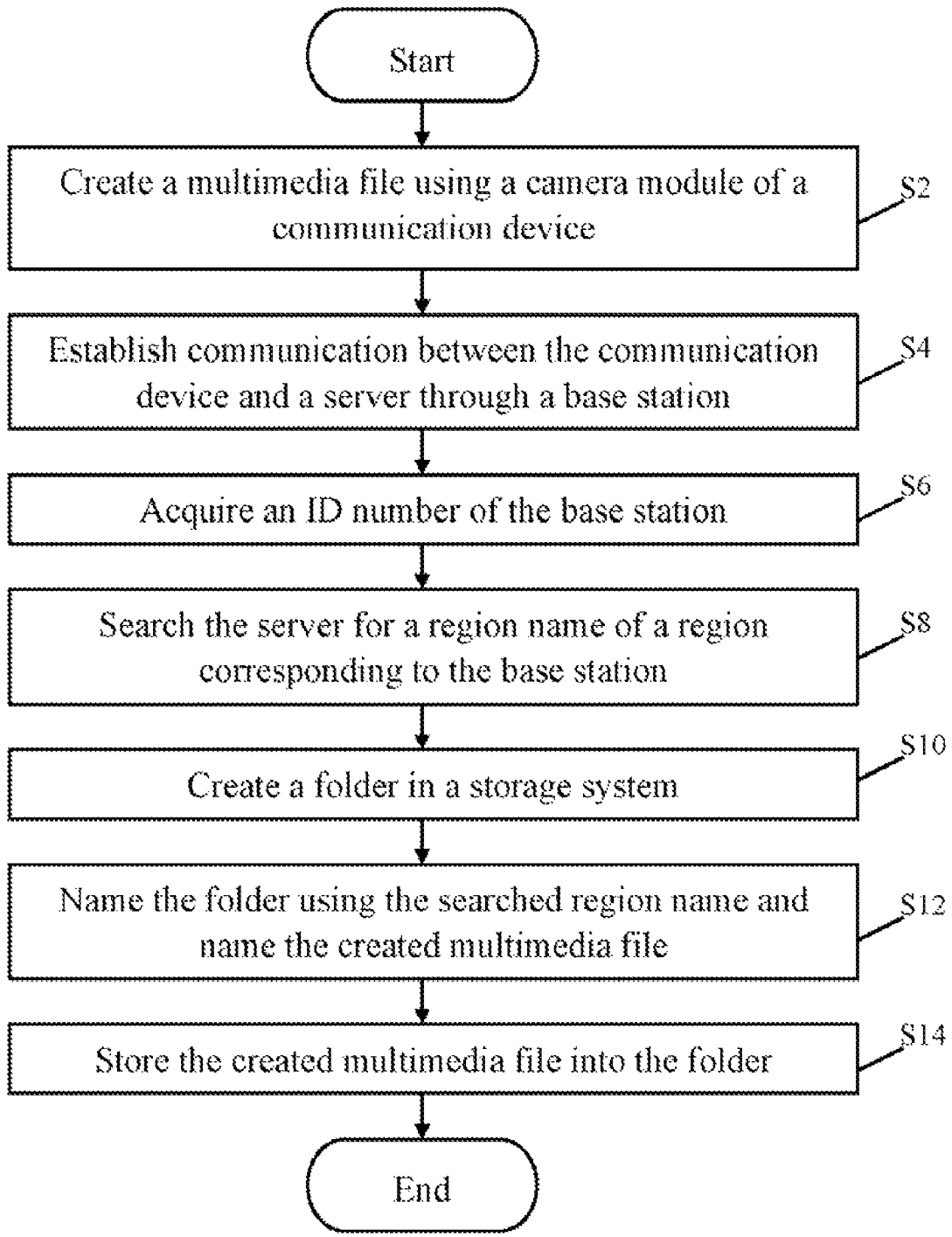
FIG. 3 is a flowchart of one embodiment of a method for managing multimedia files in the communication device 1 of FIG. 2.

FIG. 3 is a flowchart of one embodiment of a method for managing multimedia files in the communication device 1. Depending on the embodiment, additional blocks may be added, others removed, and the ordering of the blocks may be replaced.

In block S2, the camera module 10 is used to create a multimedia file by capturing a photo or a video, for example.

In block S4, the connecting module 13 establishes communication between the communication device 1 and the server 3 through a base station 2. As mentioned above, the server 3 provides an ID number of each base station 2 and a region name of a region corresponding to each base station 2.

In block S6, the acquiring module 14 identifies an ID number of the base station 2 that communicates with the communication device 1 and the server 3.

In block S8, the acquiring module 14 searches the server 3 for a region name of a region corresponding to the base station 2 according to the acquired ID number.

In block S10, the creating module 15 creates a folder in the storage system 12.

In block S12, the naming module 16 names the folder with the searched region name, and names the created multimedia file according to the searched region name and/or a creation timestamp of the multimedia file.

In block S14, the storing module 17 stores the created multimedia file into the folder.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for managing multimedia files in a communication device, the method comprising:
    creating a multimedia file using a camera module of the communication device;
    establishing communication between the communication device and a server through a base station, the server providing an identification (ID) number of each base station and a region name of a region corresponding to each base station;
    identifying an ID number of the base station, and searching the server for a region name of a region corresponding to the base station according to the acquired ID number;
    creating a folder in a storage system of the communication device, and naming the folder with the searched region name; and
    storing the created multimedia file into the folder.

2. The method according to claim 1, further comprising:
    acquiring a creation timestamp of the created multimedia file; and
    naming the created multimedia file according to the searched region name and/or the creation timestamp.

3. The method according to claim 1, before the creating step further comprising:
    determining if the storage system has a folder named with the searched region name.

4. The method according to claim 1, wherein the created multimedia file is a photo or a video.

5. The method according to claim 1, wherein the base station is a wireless base station or a mobile telephone base station.

6. The method according to claim 1, wherein the communication device is a mobile phone or a personal digital assistant.

7. A communication device for managing multimedia files, the communication device comprising:
    a camera module operable to create a multimedia file;
    a storage system;
    at least one processor; and
    one or more programs stored in the storage system and being executable by the at least one processor, the one or more programs comprising:
    a connecting module operable to establish communication between the communication device and a server through a base station, the server providing an identification (ID) number of each base station and a region name of a region corresponding to each base station;
    an acquiring module operable to acquire an ID number of the base station, and search the server for a region name of a region corresponding to the base station according to the acquired ID number;
    a creating module operable to create a folder in the storage system;
    a naming module operable to name the folder with the searched region name; and
    a storing module operable to store the created multimedia file into the folder.

8. The communication device according to claim 7, wherein the naming module is further operable to acquire a creation timestamp of the created multimedia file, and name the created multimedia file according to the searched region name and/or the creation timestamp.

9. The communication device according to claim 7, wherein the creating module is further operable to determine if the storage system has a folder named with the searched region name.

10. The communication device according to claim 7, wherein the created multimedia file is a photo or a video.

11. The communication device according to claim 7, wherein the base station is a wireless base station or a mobile telephone base station.

12. The communication device according to claim 7, wherein the communication device is a mobile phone or a personal digital assistant.

13. A non-transitory storage medium storing a set of instructions, the set of instructions capable of being executed by a processor to perform a method for managing multimedia files in a communication device, the method comprising:

creating a multimedia file using a camera module of the communication device;

establishing communication between the communication device and a server through a base station, the server providing an identification (ID) number of each base station and a region name of a region corresponding to each base station;

acquiring an ID number of the base station, and searching the server for a region name of a region corresponding to the base station according to the acquired ID number;

creating a folder in a storage system of the communication device, and naming the folder with the searched region name; and storing the created multimedia file into the folder.

14. The storage medium as claimed in claim 13, wherein the method further comprises:

acquiring a creation timestamp of the created multimedia file; and naming the created multimedia file according to the searched region name and/or the creation timestamp.

15. The storage medium as claimed in claim 13, wherein the method further comprises:

determining if the storage system has a folder named with the searched region name, before the creating step.

16. The storage medium as claimed in claim 13, wherein the created multimedia file is a photo or a video.

17. The storage medium as claimed in claim 13, wherein the base station is a wireless base station or a mobile telephone base station.

18. The storage medium as claimed in claim 13, wherein the communication device is a mobile phone or a personal digital assistant.

* * * * *